United States Patent
Yasuda et al.

(10) Patent No.: US 10,807,238 B2
(45) Date of Patent: Oct. 20, 2020

(54) ROBOT SYSTEM AND METHOD FOR CONTROLLING ROBOT

(71) Applicant: KABUSHIKI KAISHA YASKAWA DENKI, Kitakyushu-shi (JP)

(72) Inventors: Yuya Yasuda, Kitakyushu (JP); Tatsuya Nakata, Kitakyushu (JP); Tsuyoshi Ito, Kitakyushu (JP); Kiminori Nishimura, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 267 days.

(21) Appl. No.: 16/134,969

(22) Filed: Sep. 19, 2018

(65) Prior Publication Data
US 2019/0084156 A1 Mar. 21, 2019

(30) Foreign Application Priority Data
Sep. 20, 2017 (JP) .................... 2017-180517

(51) Int. Cl.
*B25J 9/16* (2006.01)
*B25J 5/00* (2006.01)
*B25J 5/02* (2006.01)

(52) U.S. Cl.
CPC ........... *B25J 9/1664* (2013.01); *B25J 5/00* (2013.01); *B25J 5/02* (2013.01); *B25J 9/16* (2013.01);
(Continued)

(58) Field of Classification Search
CPC . B25J 5/02; B25J 11/005; B25J 18/005; B25J 19/0025; B25J 9/026; B25J 9/1664;
(Continued)

(56) References Cited

U.S. PATENT DOCUMENTS

| | | | |
|---|---|---|---|
| 4,105,937 A * | 8/1978 | Tuda .................... | G05B 19/423 318/568.14 |
| 6,360,144 B1 * | 3/2002 | Bacchi .................... | B25J 9/042 414/744.3 |

(Continued)

FOREIGN PATENT DOCUMENTS

JP 2016-107380 6/2016

OTHER PUBLICATIONS

Extended European Search Report for corresponding EP Application No. 18195589, Feb. 15, 2019.

*Primary Examiner* — Bhavesh V Amin
(74) *Attorney, Agent, or Firm* — Mori & Ward, LLP (57) ABSTRACT

A robot system includes a robot, a moving body, a determination circuit, a calculation circuit, and a control circuit. The robot includes a mount and a first arm. The determination circuit is configured to determine a lastly moved part of the robot which is lastly moved to make the robot take an operation posture. The calculation circuit is configured to calculate, based on the lastly moved part, an angle between a travel direction of the moving body and an orientation axis of the first arm when the robot in the operation posture is viewed along a height axis of the robot. The control circuit is configured to control the robot to work on a workpiece keeping the robot in the operation posture with the calculated angle while controlling the moving body to move in the travel direction.

20 Claims, 6 Drawing Sheets (52) U.S. Cl.
CPC ... *B25J 9/1615* (2013.01); *G05B 2219/40252* (2013.01)

(58) Field of Classification Search
CPC ...... B25J 11/0075; B25J 18/04; B25J 9/0018; B25J 9/0096; B25J 9/042; B25J 9/06; B25J 9/106; A61G 17/007; A61G 17/0106; A61G 17/02; A61G 17/028; A61G 17/041; A61G 17/042; B60B 15/02; G05B 19/41865; G05B 19/425; G05B 2219/40385; G05B 2219/50386; Y10S 901/02; B05B 13/0452; B05B 16/00
See application file for complete search history.

(56) References Cited

U.S. PATENT DOCUMENTS

| | | | |
|---|---|---|---|
| 6,519,507 B1 | 2/2003 | Noguchi et al. | |
| 6,606,539 B2* | 8/2003 | Raab | B25J 9/1692 33/503 |
| 6,684,128 B1* | 1/2004 | Tounai | B25J 9/102 318/568.14 |
| 7,248,012 B2* | 7/2007 | Takahashi | G05B 19/425 318/568.13 |
| 7,646,161 B2* | 1/2010 | Albu-Schaffer | B25J 13/085 318/568.2 |
| 8,774,969 B2* | 7/2014 | Schreiber | G05B 19/423 700/250 |
| 9,731,419 B2* | 8/2017 | Halsmer | B25J 9/1656 |
| 9,867,588 B2* | 1/2018 | Amiri | A61B 6/547 |
| 2001/0020199 A1* | 9/2001 | Bacchi | B25J 9/042 700/245 |
| 2004/0052627 A1* | 3/2004 | Rau | E04G 21/0463 414/699 |
| 2005/0166413 A1* | 8/2005 | Crampton | B25J 13/088 33/503 |
| 2005/0253066 A1* | 11/2005 | Watanabe | G01N 23/225 250/310 |
| 2006/0259195 A1* | 11/2006 | Eliuk | B65B 55/16 700/245 |
| 2008/0188985 A1* | 8/2008 | Sakano | B25J 9/1648 700/260 |
| 2011/0106305 A1* | 5/2011 | Brethe | B25J 9/1015 700/245 |
| 2011/0313569 A1* | 12/2011 | Lafosse | G11B 17/228 700/245 |
| 2012/0123590 A1* | 5/2012 | Halsmer | B25J 9/1656 700/264 |
| 2012/0185089 A1* | 7/2012 | Schreiber | B25J 9/1656 700/250 |
| 2013/0177857 A1* | 7/2013 | Shibazaki | G03F 7/7075 430/325 |
| 2014/0113525 A1* | 4/2014 | Chan | B25J 9/1679 451/5 |
| 2015/0231781 A1* | 8/2015 | Ochiishi | H02G 11/006 414/749.1 |
| 2016/0274575 A1* | 9/2016 | Schultz | B25J 18/005 |
| 2017/0078565 A1* | 3/2017 | Ito | H04N 5/23222 |
| 2017/0095924 A1* | 4/2017 | Yamanaka | B25J 9/163 |
| 2017/0341099 A1* | 11/2017 | Kitamura | B25J 5/02 |
| 2019/0084156 A1* | 3/2019 | Yasuda | B25J 9/1664 |

* cited by examiner

ROBOT SYSTEM AND METHOD FOR CONTROLLING ROBOT

CROSS-REFERENCE TO RELATED APPLICATIONS

The present application claims priority under 35 U.S.C. § 119 to Japanese Patent Application No. 2017-180517, filed Sep. 20, 2017. The contents of this application are incorporated herein by reference in their entirety.

BACKGROUND

Field of the Invention

The embodiments disclosed herein relate to a robot system and a method for controlling a robot.

Discussion of the Background

As conventionally known, some robots have a plurality of joints and move by driving the plurality of joints. At the leading end of such robot, an end effector is mounted. The end effector varies depending on the application in which the end effector is used, such as welding and holding, enabling the robot to perform various kinds of work such as machining and moving of workpieces.

JP 2016-107380A discloses a robot system in which the foregoing kind of robot is placed on a carriage or a linear motion slider and caused to perform an operation while being carried in a predetermined travel direction.

SUMMARY

According to one aspect of the present disclosure, a robot system includes a robot, a moving body, a determination circuit, a calculation circuit, and a control circuit. The robot includes a mount and a first arm. The mount is rotatable about a height axis along a height of the robot. The first arm is connected to the mount rotatably around a first axis substantially perpendicular to the height axis. The first arm has an orientation axis which is substantially perpendicular to the first axis and which passes through the first axis. The mount is mounted on the moving body and the moving body is movable in a travel direction. The determination circuit is configured to determine a lastly moved part of the robot which is lastly moved to make the robot take an operation posture. The calculation circuit is configured to calculate, based on the lastly moved part, an angle between the travel direction and the orientation axis of the first arm when the robot in the operation posture is viewed along the height axis. The control circuit is configured to control the robot to work on a workpiece keeping the robot in the operation posture with the calculated angle while controlling the moving body to move in the travel direction.

According to another aspect of the present disclosure, a method for controlling a robot, includes determining, by a determination circuit, a lastly moved part of the robot which is lastly moved to make the robot take an operation posture. The robot comprises a mount rotatable about a height axis along a height of the robot and a first arm connected to the mount rotatably around a first axis substantially perpendicular to the height axis. The first arm has an orientation axis which is substantially perpendicular to the first axis and which passes through the first axis. The method includes calculating, by a calculation circuit, based on the lastly moved part, an angle between a travel direction and the orientation axis of the first arm when the robot in the operation posture is viewed along the height axis. The mount is mounted on a moving body which is movable in the travel direction. The method includes controlling, by a control circuit, the robot to work on a workpiece keeping the robot in the operation posture with the calculated angle while controlling the moving body to move in the travel direction.

According to a further aspect of the present disclosure, a robot system includes a robot, a moving body, determining means, calculating means and controlling means. The robot includes a mount and a first arm. The mount is rotatable about a height axis along a height of the robot. The first arm is connected to the mount rotatably around a first axis substantially perpendicular to the height axis. The first arm has an orientation axis which is substantially perpendicular to the first axis and which passes through the first axis. The mount is mounted on the moving body and the moving body is movable in a travel direction. The determining means are for determining a lastly moved part of the robot which is lastly moved to make the robot take an operation posture. The calculating means are for calculating, based on the lastly moved part, an angle between the travel direction and the orientation axis of the first arm when the robot in the operation posture is viewed along the height axis. The controlling means are for controlling the robot to work on a workpiece keeping the robot in the operation posture with the calculated angle while controlling the moving body to move in the travel direction.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

By referring to the accompanying drawings, a robot system and a method for producing a workpiece according to embodiments will be described in detail below. It is noted that the following embodiments are provided for exemplary purposes only and are not intended in a limiting sense. While in the following description the robot performs sealing, which is a sealant applying operation, sealing is not intended as limiting the type of operation to be performed. Other examples of operation include, but are not limited to, coating and welding.

In the following description, terms such as "orthogonal", "perpendicular", "parallel", "identical", and "same" may not necessarily be used in a strict sense. Also in the following description, angle-indicating values are not intended in a limiting sense. That is, these terms and values are used with production-related and installation-related tolerances and errors taken into consideration.

Figure 1:
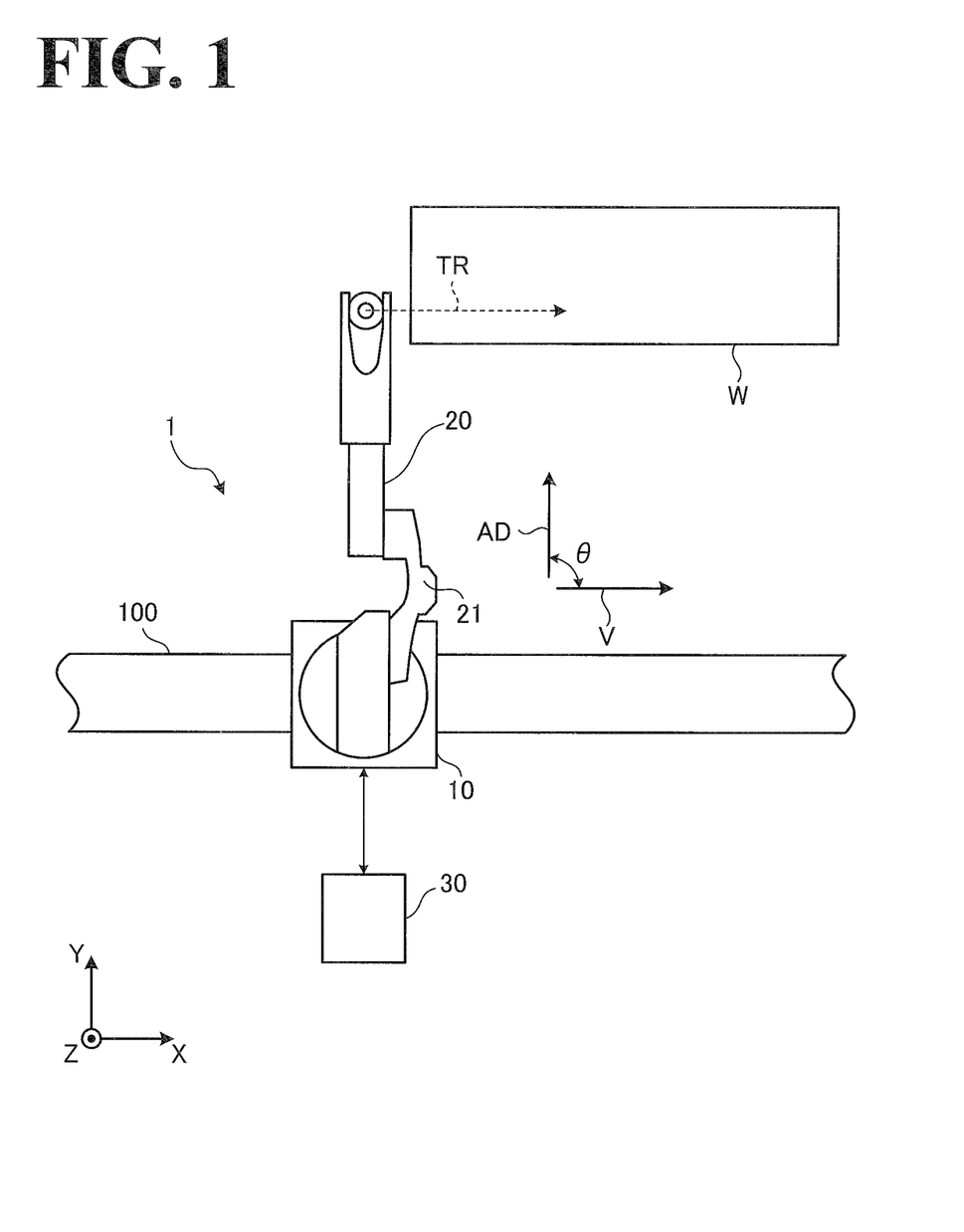
FIG. 1 is a schematic top view of a robot system according to an embodiment.

A robot system 1 according to this embodiment will be described by referring to FIG. 1. FIG. 1 is a schematic top view of the robot system 1 according to this embodiment. In the schematic illustrated in FIG. 1, the robot system 1 is viewed from above. For ease of description, FIG. 1 also illustrates a three-dimensional orthogonal coordinate system, with X, Y, Z axes. The positive direction of the Z axis is its vertically upward direction, and the positive direction of the X axis is the direction in which the robot taking an operation posture travels. This orthogonal coordinate system may also be illustrated in some other drawings referred to in the following description.

As illustrated in FIG. 1, the robot system 1 includes a traveler 10, a robot 20, and a controller 30. The traveler 10 is a travel device such as a carriage and a linear motion slider, and travels in a horizontal direction along a linear rail 100, which is located in an operation chamber. The robot 20 is placed on the traveler 10 and performs an operation on a workpiece W from below the workpiece W. An exemplary configuration of the robot 20 will be described later by referring to FIG. 2.

The controller 30 controls the motion of the traveler 10 and the motion of the robot 20. The controller 30 causes the traveler 10 to travel with the posture of the robot 20 fixed to a predetermined operation posture on the traveler 10. In this manner, the controller 30 causes the robot 20 to perform the operation on the workpiece W.

For reference purposes, FIG. 1 illustrates an operation track TR of the robot 20. Since the posture of the robot 20 is fixed to the operation posture while the robot 20 is performing the operation, the position of the robot 20 relative to the workpiece W depends solely on the travel of the traveler 10. With this configuration, the robot 20 forms a linear operation track TR.

Based on a last portion of the robot 20 that makes a last movement to implement the operation posture, the controller 30 determines an angle θ of an arm orientation AD of the first arm 21 of the robot 20 taking the operation posture relative to a travel direction V of the traveler 10. The angle θ is as viewed from above the first arm 21 and the traveler 10 ("as viewed from above the first arm 21 and the traveler 10" will be hereinafter referred to as "as viewed from above").

This is because the vibration direction in which the robot 20 vibrates depends on the last portion of the robot 20 that makes a last movement to implement the operation posture, and a particular vibration direction may be detrimental to linearity of the operation track TR. That is, the controller 30 determines the arm orientation AD of the first arm 21 so as to make the vibration direction of the robot 20 less influential to the linearity of the operation track TR. This will be detailed later by referring to FIGS. 4A, 4B, 5A, and 5B.

Figure 2:
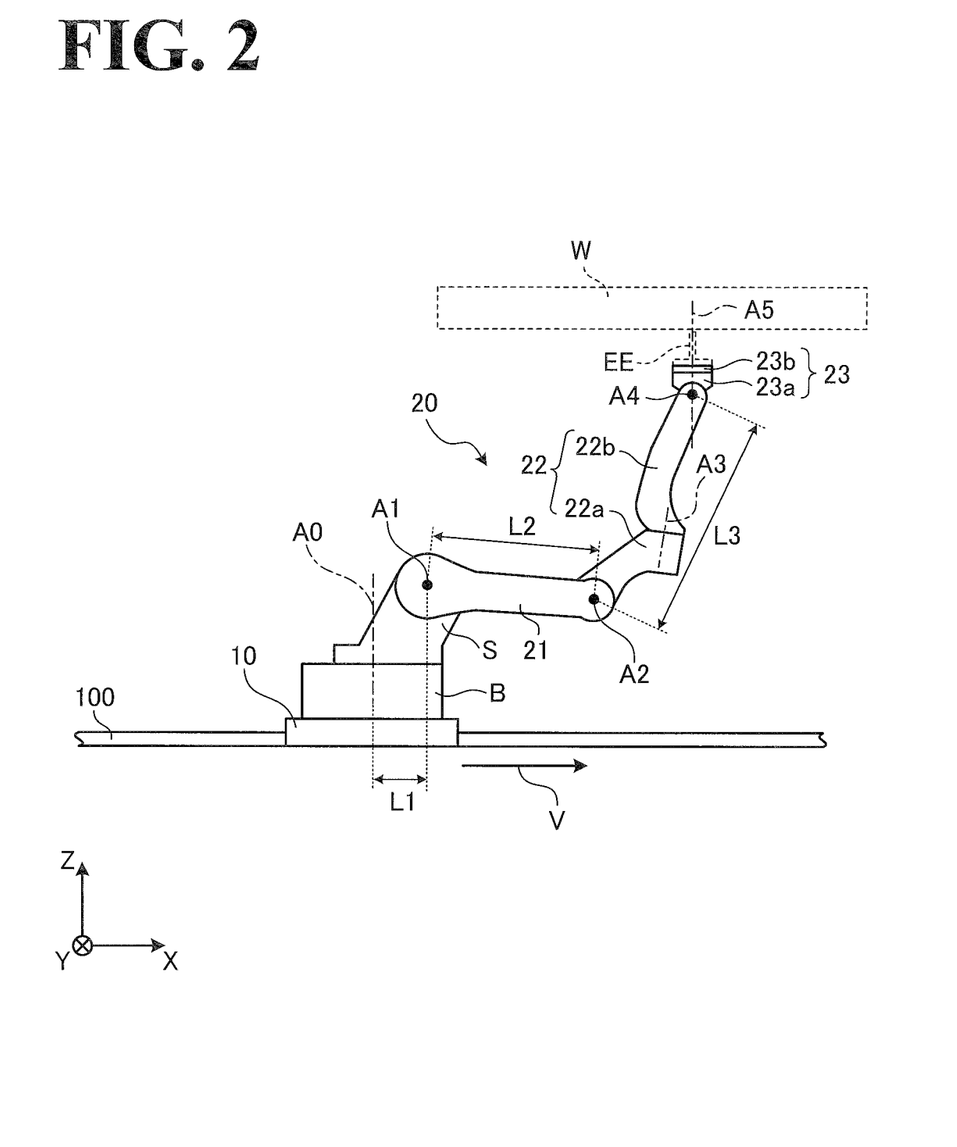
FIG. 2 is a side view of a robot of the robot system.

An exemplary configuration of the robot 20 will be described by referring to FIG. 2. FIG. 2 is a side view of the robot 20. As illustrated in FIG. 2, the robot 20 is a "vertical multi-articular robot" having six axes, namely, vertical axis A0 to fifth axis A5. The robot 20 includes (in increasing order of distance from the base end) a base B, a turnable portion S, the first arm 21, a second arm 22, and a wrist 23. In this embodiment, each of these movable portions will occasionally be referred to as "portion" of the robot 20.

The base B, on its lower surface, is fixed to the traveler 10. The turnable portion S, at its base end, is supported by the upper surface of the base B and is turnable about the vertical axis A0. The first arm 21, at its base end, is supported by the leading end of the turnable portion S and is turnable about first axis A1, which is perpendicular to the vertical axis A0.

In this embodiment, the arm orientation AD of the first arm 21 is the direction in which the first arm 21 extends. In another possible embodiment, the arm orientation AD of the first arm 21 may be the direction of a vector that is perpendicular to the first axis A1 and the second axis A2 and that is directed from the first axis A1 toward the second axis A2.

The second arm 22, at its base end, is supported by the leading end of the first arm 21 and is turnable about second axis A2, which is parallel to the first axis A1. The wrist 23, at its base end, is supported by the leading end of the second arm 22 and is turnable about fourth axis A4, which is parallel to the second axis A2.

The second arm 22 includes a base-end second arm 22a and a leading-end second arm 22b. The leading-end second arm 22b, at its base end, is supported by the leading end of the base-end second arm 22a and is rotatable about third axis A3, which is perpendicular to the second axis A2. As described above, the second arm 22 is turnable about the second axis A2, which is parallel to the first axis A1, and thus a view from above the second arm 22 shows that the orientation of the second arm 22 is the same as the orientation of the first arm 21.

In describing an axis configuration of a vertical multi-articular robot, it is common practice to describe the base-end second arm 22a of the second arm 22 as "second arm" and describe the leading-end second arm 22b of the second arm 22 and the wrist 23 as "wrist". In this embodiment, however, the base-end second arm 22a and the leading-end second arm 22b are collectively described as the second arm 22 because of the necessity of describing arm length L3, described later.

The wrist 23 includes a base-end wrist 23a and a leading-end wrist 23b. The leading-end wrist 23b is supported by the leading end of the base-end wrist 23a and is rotatable about the fifth axis A5, which is orthogonal to the fourth axis A4. At the leading end of the leading-end wrist 23b, an attachable and detachable end effector EE is mounted. In this embodiment, the end effector EE is a sealing device. Other examples of the end effector EE include, but are not limited to, a coating device and an arc welder.

The second arm 22 and the wrist 23 each may have a hollow structure. This allows cables and/or wires for the end effector EE to pass through the hollow structures. This, in turn, eliminates or minimizes the influence of cables and/or wires on vibration of the robot 20, resulting in minimized vibration of the robot 20 itself.

In making a hollow structure in the second arm 22, it is possible to make hollow the leading-end second arm 22b and a portion of the base-end second arm 22a that is located around the third axis A3. That is, it is possible to make the base-end second arm 22a hollow only partially.

The vertical axis A0 and the first axis A1 are offset from each other in a horizontal direction by an offset length L1. Also, the arm length, L2, of the first arm 21 is smaller than the arm length L3 of the second arm 22. The offset length L1 is smaller than the arm length L2 of the first arm 21.

In other words, the arm length L2 of the first arm 21 is longer than the offset length L1 between the vertical axis A0 and the first axis A1, and the arm length L3 of the second arm 22 is longer than the arm length L2 of the first arm 21.

The arm length L2 corresponds to the axis-to-axis distance between the first axis A1 and the second axis A2, and the arm length L3 corresponds to the axis-to-axis distance between the second axis A2 and the fourth axis A4.

The offset configuration in which the vertical axis A0 and the first axis A1 are offset from each other makes the movable range of the first arm 21 as wide as possible while preventing the first arm 21 from contacting the turnable portion S and the base B.

Also, establishing the relationship "offset length L1<arm length L2<arm length L3" makes the operational range of the robot 20 against the workpiece W as wide as possible while minimizing the difference in height between the base B of the robot 20 and the workpiece W (the operational range corresponds to the area of a plane parallel to the X-Y plane).

In other words, the workpiece W can be positioned as close to the robot 20 as possible while ensuring a sufficiently wide operational range for the robot 20. That is, the workpiece W can be positioned as close to the rail 100 as possible, making the operation chamber lower in height.

The robot 20 is capable of performing an operation on the workpiece W while taking the operation posture illustrated in FIG. 2. Specifically, the operation posture illustrated in FIG. 2 is defined as such a posture that the leading end of the first arm 21 is further away from the vertical axis A0 than the first axis A1 is away from the vertical axis A0, the leading end of the second arm 22 is further away from the vertical axis A0 than the second axis A2 is away from the vertical axis A0, the leading end of the second arm 22 is above a plane including the first axis A1 and the second axis A2 (that is, the joint between the first arm 21 and the second arm 22 takes a "downward-directed elbow" posture).

This operation posture is made possible because the robot system 1 restricts the arm orientation AD, as viewed from above, of the first arm 21 to directions that eliminate or minimize vibration of the robot 20. Specifically, when a robot takes the operation posture illustrated in FIG. 2 and performs an operation on a workpiece at an operation position far from the turnable portion of the robot, it is generally possible for the robot to vibrate to a greater degree.

In contrast, the robot system 1 restricts the arm orientation AD, as viewed from above, of the first arm 21 to directions that make vibration of the robot 20 less influential. This prevents the robot 20 from forming a meandering operation track even while the robot 20 is taking the operation posture illustrated in FIG. 2. The operation posture of the robot 20 is such that the joint between the first arm 21 and the second arm 22 takes a downward-directed elbow posture. This widens the operational range of the robot 20 against the workpiece W without greatly changing the posture of the robot 20, as compared with an upward-directed elbow posture.

Figure 3:
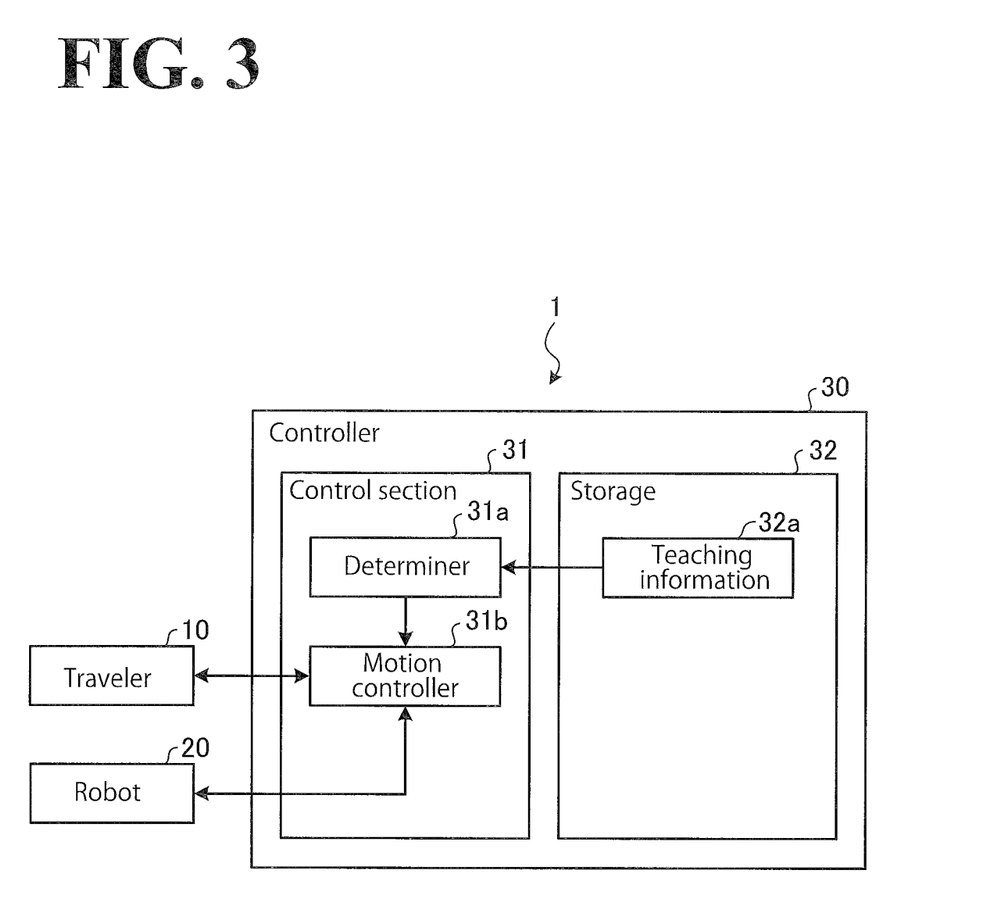
FIG. 3 is a block diagram illustrating a configuration of the robot system.

A configuration of the controller 30 will be described by referring to FIG. 3. FIG. 3 is a block diagram of the controller 30. As illustrated in FIG. 3, the controller 30 is connected to the traveler 10 and the robot 20. The controller 30 includes a control section 31 and a storage 32.

The control section 31 includes a determiner 31a and a motion controller 31b. The storage 32 stores teaching information 32a. While in FIG. 1 a single controller 30 is illustrated for simplicity of description, it is also possible to use a plurality of controllers 30 each corresponding to one of the traveler 10 and the robot 20. In this case, it is possible to provide an upper-level controller that controls over the plurality of controllers.

The controller 30 includes a computer and various circuits. The computer includes a central processing unit (CPU), a read only memory (ROM), a random access memory (RAM), a hard disk drive (HDD), and input-output ports.

The CPU of the computer reads programs stored in, for example, the ROM and executes the programs to serve the functions of the determiner 31a and the motion controller 31b of the control section 31.

Also, at least one or all of the determiner 31a and the motion controller 31b may be implemented by hardware such as an application specific integrated circuit (ASIC) and a field programmable gate array (FPGA).

The storage 32 corresponds to the RAM and/or the HDD. The RAM and the HDD are capable of storing the teaching information 32a. It will be understood by those skilled in the art that the controller 30 may obtain the above-described programs and the various kinds of information from another computer connected to the controller 30 through a wired or wireless network or from a portable recording medium. As described above, it is possible to provide a plurality of controllers 30 communicable with each other. In this case, the plurality of controllers 30 may be implemented in a hierarchical configuration in which each controller 30 is communicable with an upper-level or lower-level controller 30.

The control section 31 controls the motion of the traveler 10 and the motion of the robot 20. When a plurality of controllers 30 are provided, the control section 31 may also perform processing of synchronizing the controllers 30.

The determiner 31a reads the teaching information 32a, which is prepared in advance. The teaching information 32a is information that is prepared in the teaching stage, in which the robot 20 is taught a motion, and that contains "jobs" constituting a program defining a motion path for the robot 20.

Then, the determiner 31a determines the angle θ of the arm orientation AD, as viewed from above, of the first arm 21 of the robot 20 taking the operation posture relative to the travel direction V of the traveler 10. The determiner 31a makes this determination based on the last portion of the robot 20 that makes a last movement to implement the operation posture. Then, the determiner 31a outputs, to the motion controller 31b, teaching information 32a including the determined angle θ. The processing of determining the angle θ will be detailed later by referring to FIGS. 4A, 4B, 5A, and 5B.

The motion controller 31b causes the robot 20 to move based on the teaching information 32a including the angle θ determined by the determiner 31a. The motion controller 31b also improves motion accuracy of the robot 20 by, for example, performing feedback control using a value from an encoder of an actuator such as the motor of the robot 20, which is the motive power source of the robot 20.

While in FIG. 3 the traveler 10 and the robot 20 are independent of each other, it is also possible to treat the traveler 10 as one axis of the robot 20. Alternatively, a plurality of pairs of the traveler 10 and the robot 20 may be prepared and connected to the controller 30, and the controller 30 may control the motions of the pairs.

Figure 4A:
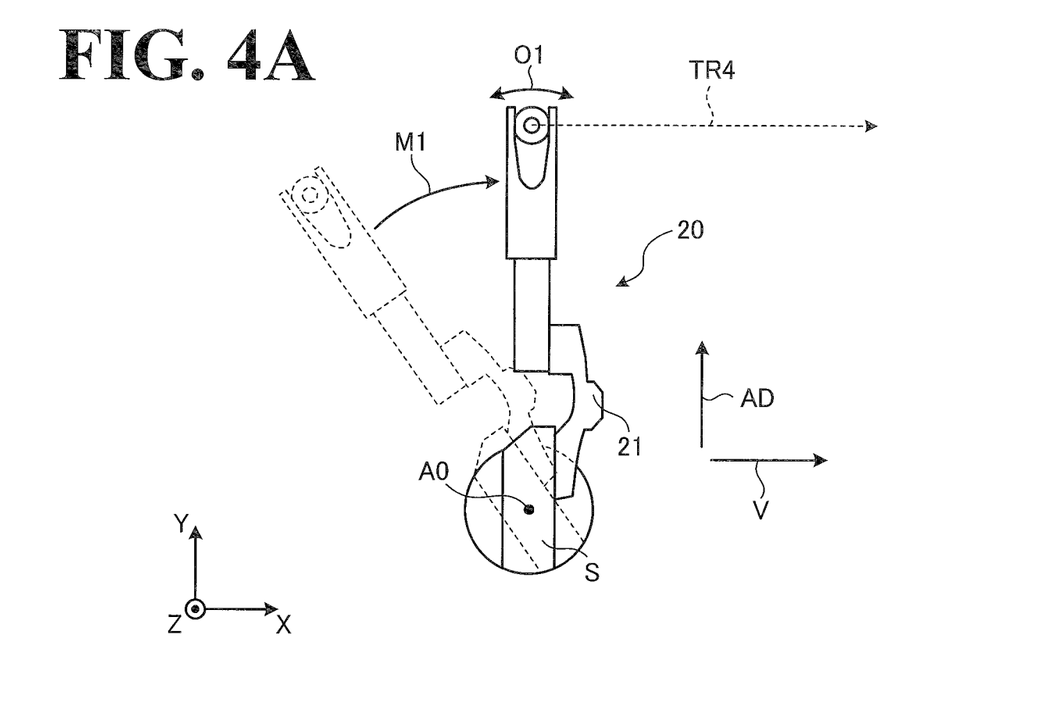
FIG. 4A illustrates an operation posture implemented by turning a turnable portion.

Details of the processing performed by the determiner 31a illustrated in FIG. 3 will be described by referring to FIGS. 4A to 5B. FIG. 4A illustrates the operation posture implemented by turning the turnable portion S. FIG. 4A illustrates a case where the arm orientation AD, as viewed from above, of the first arm 21 of the robot 20 taking the operation posture is 90 degrees in the anti-clockwise direction relative to the travel direction V of the traveler 10 (see FIG. 1).

The robot 20 in the posture indicated by the broken lines in FIG. 4A turns the turnable portion S in direction M1 to take the operation posture indicated by the solid lines in FIG. 4A. In this case, the robot 20 vibrates in vibration directions O1 illustrated in FIG. 4A. The vibration directions O1 are indicated by the two arrows extending in the circumferential directions of the vertical axis A0, which is the center of turning of the turnable portion S.

Thus, when the last movement to implement the operation posture is a turning of the turnable portion S, the determiner 31a illustrated in FIG. 3 determines the arm orientation AD, as viewed from above, of the first arm 21 as 90 degrees (illustrated in FIG. 4A) or −90 degrees (not illustrated) in the anti-clockwise direction relative to the travel direction V (X axis positive direction). It will be understood by those skilled in the art that "90 degrees" and "−90 degrees" of angles are not intended in a strict sense but may vary within an exemplary range of −10 degrees, including operation-related and production-related tolerances and errors.

This ensures that the vibration in the vibration directions O1 has a minimal component in the direction (Y axis direction) orthogonal to the travel direction V. This facilitates the attempt to maintain the linearity of operation track TR4 illustrated in FIG. 4A. That is, the vibration of the robot 20 that can be caused to occur by turning of the turnable portion S is made less influential to meandering of the operation track TR4.

Figure 4B:
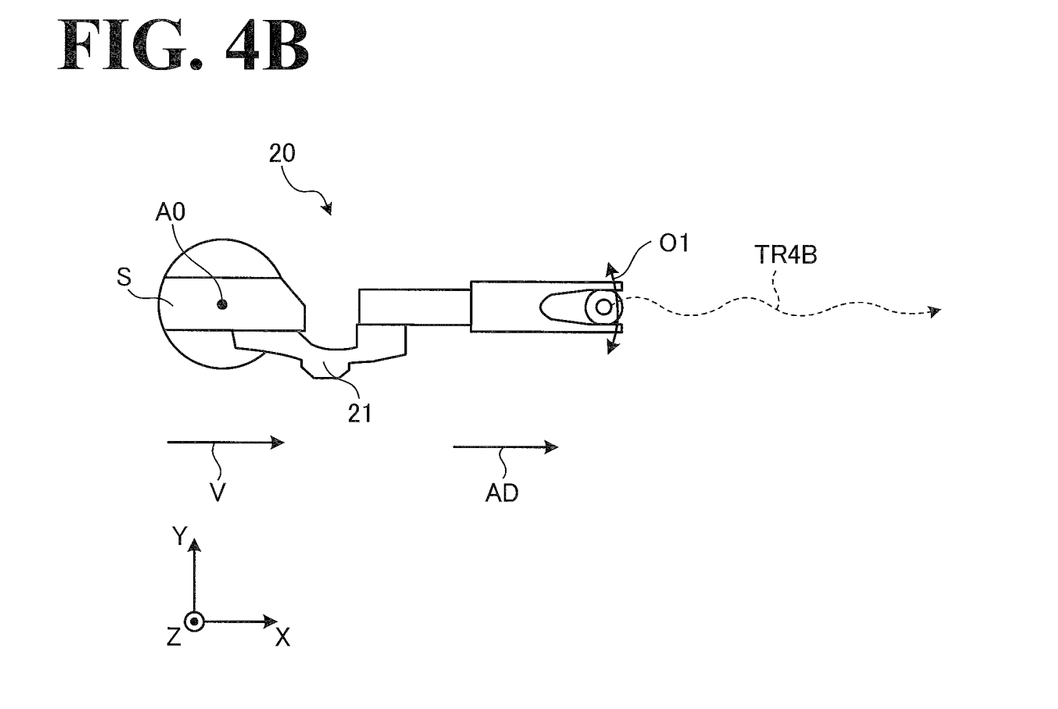
FIG. 4B illustrates, for reference purposes, a vibration that can be caused to occur by turning of the turnable portion.

For reference purposes, by referring to FIG. 4B, description will be made with regard to the operation track TR4B in a case where the arm orientation AD, as viewed from above, of the first arm 21 is parallel to the travel direction V (X axis positive direction). FIG. 4B illustrates, for reference purposes, a vibration that can be caused to occur by turning of the turnable portion S. In FIG. 4B, the arm orientation AD, as viewed from above, of the first arm 21 of the robot 20 agrees with the travel direction V (X axis positive direction). That is, the angle, θ, between the arm orientation AD and the travel direction V is 0 degrees.

As illustrated in FIG. 4B, when the arm orientation AD of the first arm 21 agrees with the travel direction V (X axis positive direction), the Y axis component of the vibration in the vibration directions O1 illustrated in FIG. 4A is at its maximum. This causes the operation track TR4B to be affected by the vibration of the robot 20, resulting in the meandering track illustrated in FIG. 4B to the detriment of the accuracy of operation performed by the robot 20. It will be understood by those skilled in the art that the foregoing description also applies in the case where the arm orientation AD is opposite to the travel direction V (X axis positive direction), that is, the angle θ between the arm orientation AD and the travel direction V is 180 degrees.

As seen from FIGS. 4A and 4B, when the turnable portion S is caused to turn immediately before the operation posture is implemented, the determiner 31a makes the arm orientation AD of the first arm 21 perpendicular to the travel direction V (X axis positive direction). This minimizes the influence of the vibration of the robot 20 that can be caused to occur by turning of the turnable portion S. It will be understood by those skilled in the art that the turning direction of the turnable portion S will not be limited to the direction M1 illustrated in FIG. 4. Another possible example of the turning direction of the turnable portion S is a direction opposite to the direction M1.

Figure 5A:
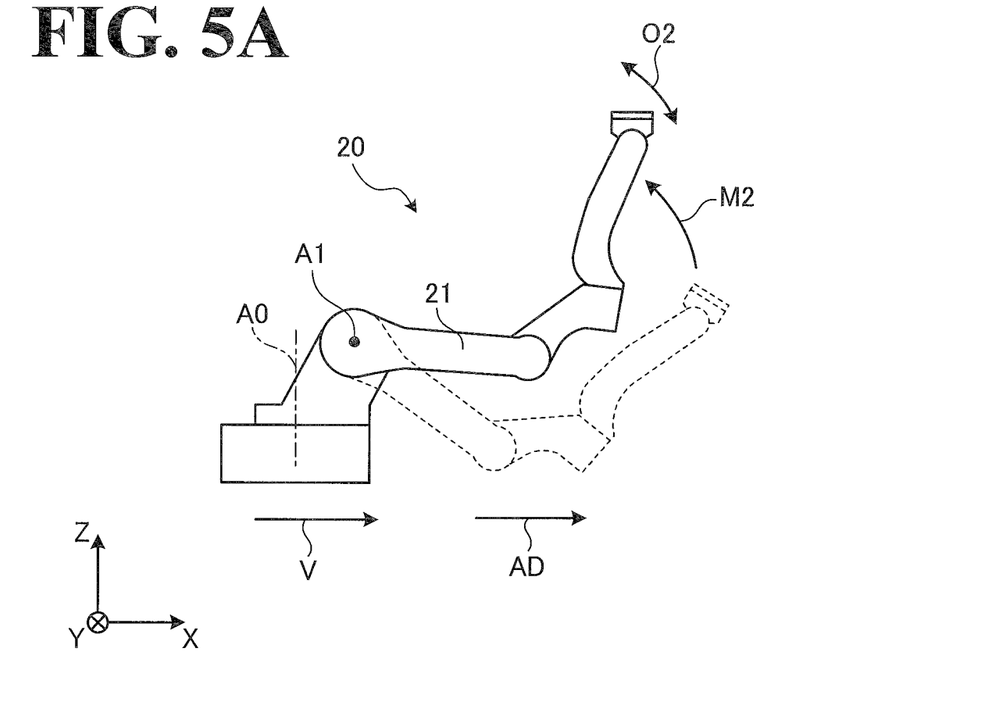
FIG. 5A illustrates the operation posture implemented by turning a first arm.
Figure 5B:
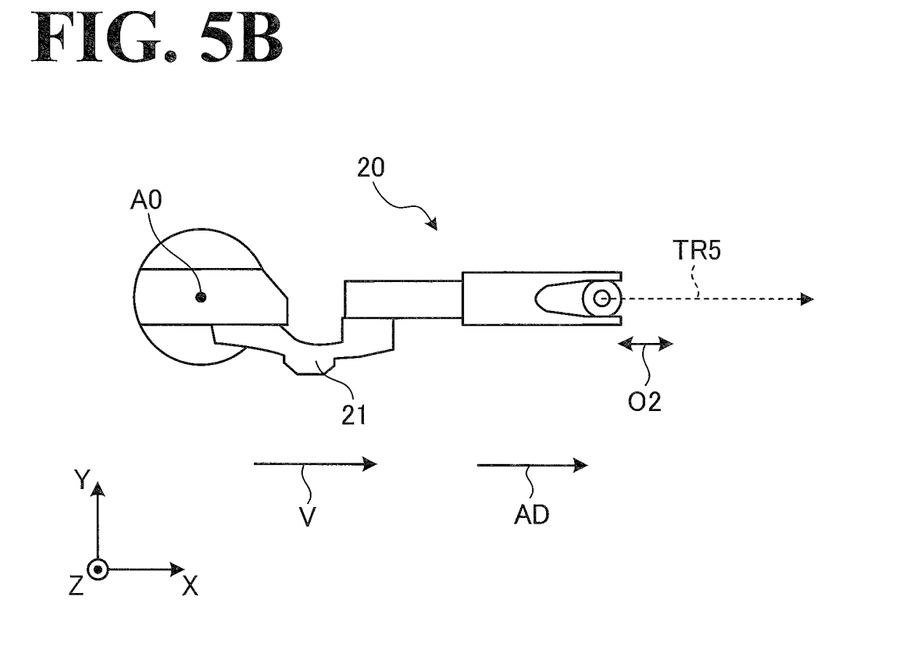
FIG. 5B illustrates a vibration that can be caused to occur by turning of the first arm.

By referring to FIGS. 5A and 5B, description will be made with regard to a case where the robot 20 takes the operation posture by turning the first arm 21. FIG. 5A illustrates the operation posture implemented by turning the first arm 21, and FIG. 5B illustrates a vibration that can be caused to occur by turning of the first arm 21. It is to be noted that the arm orientation AD of the first arm 21 is the same (X axis positive direction) throughout FIGS. 5A and 5B, as opposed to the relationship between FIGS. 4A and 4B.

The robot 20 in the posture indicated by broken lines in FIG. 5A turns the first arm 21 in direction M2 to take the operation posture indicated by the solid lines in FIG. 5A. In this case, the robot 20 vibrates in vibration directions O2 illustrated in FIG. 5A. The vibration directions O2 are indicated by the two arrows extending in the circumferential directions of the first axis A1, which is the center of turning of the first arm 21.

Thus, when the last movement to implement the operation posture is a turning of the first arm 21, the determiner 31a illustrated in FIG. 3 determines the arm orientation AD, as viewed from above, of the first arm 21 as 0 degrees (illustrated in FIG. 5A) or 180 degrees (not illustrated) in the anti-clockwise direction relative to the travel direction V (X axis positive direction). It will be understood by those skilled in the art that the arm orientation AD is determined as 0 degrees or 180 degrees in the clockwise as well. It will be understood by those skilled in the art that "0 degrees" and "180 degrees" of angles are not intended in a strict sense but may vary within an exemplary range of +10 degrees, including operation-related and production-related tolerances and errors.

This ensures that the vibration in the vibration directions O2 has a minimal component in the direction (Y axis direction) orthogonal to the travel direction V. This facilitates the attempt to maintain the linearity of operation track TR5 illustrated in FIG. 5A. That is, the vibration of the robot 20 that can be caused to occur by turning of the first arm 21 is made less influential to meandering of the operation track TR5.

Assume that the arm orientation AD, as viewed from above, of the first arm 21 is perpendicular to the travel direction V (this configuration is not illustrated). In this case, the Y axis component of the O2-direction vibration caused to occur by turning of the first arm 21 is at its maximum. This causes the operation track TR5 to be affected by the vibration of the robot 20, resulting in a meandering track similar to the operation track TR4B illustrated in FIG. 4B.

As seen from FIGS. 5A and 5B, when the first arm 21 is caused to turn immediately before the operation posture is implemented, the determiner 31a makes the arm orientation AD of the first arm 21 parallel to the travel direction V (X axis positive direction). This minimizes the influence of the vibration of the robot 20 that can be caused to occur by turning of the first arm 21. It will be understood by those skilled in the art that the turning direction of the first arm 21 will not be limited to the direction M2 illustrated in FIG. 5A. Another possible example of the turning direction of the first arm 21 is a direction opposite to the direction M2.

While in FIGS. 5A and 5B the last movement to implement the operation posture is a turning of the first arm 21, this configuration is not intended in a limiting sense. For example, the last movement to implement the operation posture may be a turning of the second arm 22, which turns about the second axis A2, which is parallel to the first axis A1 (which is the turning axis of the first arm 21). In this case as well, the robot 20 may take the operation posture as illustrated in FIGS. 5A and 5B.

Figure 6:
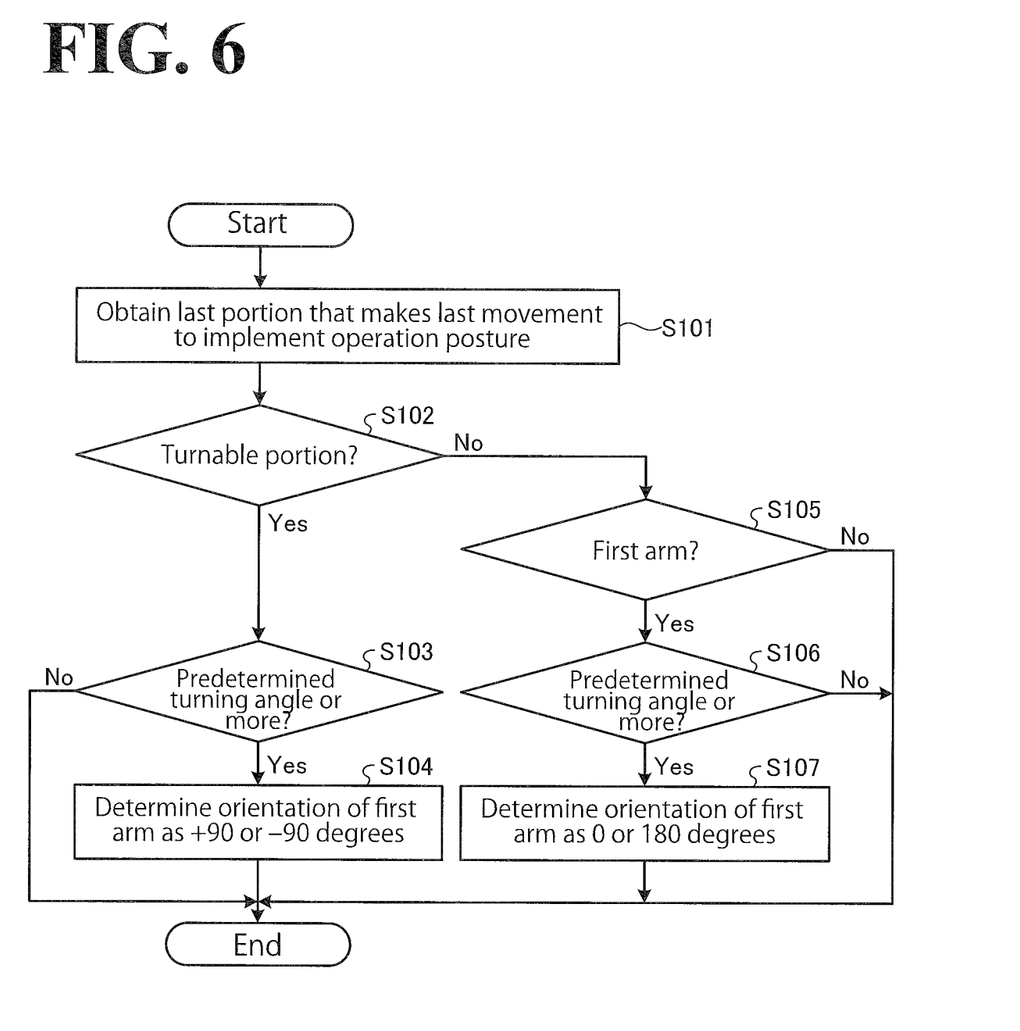
FIG. 6 is a flowchart of a procedure for processing performed by a controller.

By referring to FIG. 6, a procedure for processing performed by the controller 30 illustrated in FIG. 3 will be described. FIG. 6 is a flowchart of a procedure for processing performed by the controller 30. As illustrated in FIG. 6, the determiner 31a of the controller 30 reads the teaching information 32a to obtain a last portion of the robot 20 that makes a last movement to implement the operation posture (step S101).

Next, the determiner 31a determines whether the last portion of the robot 20 that makes the last movement to implement the operation posture is the turnable portion S (step S102). When the last portion of the robot 20 that makes the last movement to implement the operation posture is the turnable portion S (Yes at step S102), the determiner 31a determines whether the turning angle of the turnable portion S is equal to or more than a predetermined angle (step S103).

When the turning angle of the turnable portion S is equal to or more than a predetermined angle (Yes at step S103), the determiner 31a determines the arm orientation AD of the first arm 21 relative to the travel direction V as +90 degrees or −90 degrees (step S104), and the entire processing ends. When the condition at step S103 is not satisfied (No at step S103), the entire processing ends.

When the condition at step S102 is not satisfied (No at step S102), the determiner 31a determines whether the last portion of the robot 20 that makes the last movement to implement the operation posture is the first arm 21 (step S105). When the last portion of the robot 20 that makes the last movement to implement the operation posture is the first arm 21 (Yes at step S105), the determiner 31a determines whether the turning angle of the first arm 21 is equal to or more than a predetermined angle (step S106).

When the turning angle of the first arm 21 is equal to or more than a predetermined angle (Yes at step S106), the determiner 31a determines the arm orientation AD of the first arm 21 relative to the travel direction V as 0 degrees or 180 degrees (step S107), and the entire processing ends. When the condition at step S106 is not satisfied (No at step S106), the entire processing ends.

When the condition at step S105 is not satisfied (No at step S105), the entire processing ends. In this case (No at step S105), it is also possible to: determine whether the last portion of the robot 20 that makes the last movement to implement the operation posture is the second arm 22; and when the last portion is the second arm 22, perform steps similar to step S106 through step S107.

It is also possible to omit one or both of step S103 and step S106 and determine the arm orientation AD of the first arm 21 regardless of the turning angle of the last portion of the robot 20 that makes the last movement to implement the operation posture. It is also possible to make the predetermined angle used at S103 different from the predetermined angle used at step S106.

When the last portion of the robot 20 that makes the last movement to implement the operation posture is identified, it may be found that a period of time is left after the robot 20 has taken the operation posture and before the robot 20 starts an operation. If the period of time is equal to or longer than a predetermined period of time, the arm orientation AD of the first arm 21 may not necessarily be restricted. This is because if there is a sufficiently long period of time after the robot 20 has taken the operation posture and before the robot 20 starts an operation, it is possible for the robot 20 to stop vibrating during this long period of time.

When there is no last portion of the robot 20 that makes a last movement to implement the operation posture, a basic configuration is not to restrict the arm orientation AD of the first arm 21. This configuration, however, is not intended in a limiting sense. For example, if the traveler 10 is accelerated or decelerated when the arm orientation AD of the first arm 21 relative to the travel direction V is at an angle of somewhere near +45 degrees, +135 degrees, −45 degrees, or −135 degrees, the robot 20 may vibrate in the vibration directions O1 illustrated in FIG. 4A, affecting the operation track TR to a greater degree.

In this case, the determiner 31a may determine the arm orientation AD of the first arm 21 relative to the travel direction V as +90 degrees or −90 degrees. The determiner 31a may make this determination only when the robot 20 is taking such a posture that the distance, as viewed from above, between the vertical axis A0 and the leading end of the robot 20 is equal to or more than a predetermined distance. This is because the robot 20 is more likely to vibrate when the robot 20 is taking such a posture that the first arm 21 and the second arm 22 extend over a long distance away from the vertical axis A0.

Thus, the processing performed by the controller 30 according to the procedure illustrated in FIG. 6 improves the accuracy of operation on the workpiece W. This ensures that workpieces W, as finished products, are produced with improved accuracy.

As has been described hereinbefore, the robot system 1 according to this embodiment includes the robot 20, the traveler 10, and the controller 30. The robot 20 performs an operation on the workpiece W. On the traveler 10, the robot 20 is placed, and the traveler 10 travels in a horizontal direction. The controller 30 controls the motion of the robot 20 and the motion of the traveler 10.

The robot 20 includes the turnable portion S and the first arm 21. The turnable portion S is turnable about the vertical axis A0. The first arm 21 is supported by the turnable portion S at the base end of the first arm 21, and is turnable about the first axis A1, which is perpendicular to the vertical axis A0.

The controller 30 includes the determiner 31a. When the robot 20 performs the operation on the workpiece W with the traveler 10 traveling and with the posture of the robot 20 fixed to an operation posture, the determiner 31a determines the angle θ, as viewed from above, of the orientation of the first arm 21 in the operation posture relative to the travel direction V of the traveler 10 based on a last portion of the robot 20 that makes a last movement to implement the operation posture.

Thus, the robot system 1 according to this embodiment determines the orientation, as viewed from above, of the first arm 21 based on a last portion of the robot 20 that makes a last movement to implement the operation posture. This ensures that an operation posture in which a vibration of the robot 20 is least influential is selected. This prevents an operation track formed by the robot 20 from meandering when the robot 20 is caused to vibrate.

While in the above-described embodiment the robot 20 performs an operation from below the workpiece W, the robot 20 may perform an operation from above or beside the workpiece W.

While in the above-described embodiment the traveler 10 travels along the linear rail 100 causing an approximately linear operation track TR on the workpiece W, the rail 100 may have other than a linear shape.

For example, the traveler 10 may travel along a rail 100 having a circular or arcuate shape as viewed from above so that the robot 20 performs an operation on the workpiece W while forming an operation track TR similar to the circular or arcuate shape of the rail 100. In this case, the arm orientation AD of the first arm 21 may be parallel to a tangent of the operation track TR or parallel to a normal line of the operation track TR (which is an orientation perpendicular to the foregoing tangent of the operation track TR).

The shape of the rail 100 as viewed from above will not be limited to a circular shape and an arcuate shape. Another possible example is a smoothly curving shape formed by connecting arcs together, causing the traveler 10 to smoothly changing travel directions. In this case as well, the arm orientation AD of the first arm 21 may be parallel to a tangent of the operation track TR or parallel to a normal line of the operation track TR (which is an orientation perpendicular to the foregoing tangent of the operation track TR).

While in the above-described embodiment the robot 20 is a six-axis robot, the robot 20 may be a robot having five or less axes or may be a robot having equal to or more than seven axes.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A robot system comprising:
    a robot comprising:
        a mount rotatable about a height axis along a height of the robot; and
        a first arm connected to the mount rotatably around a first axis substantially perpendicular to the height axis, the first arm having an orientation axis which is substantially perpendicular to the first axis and which passes through the first axis;
    a moving body on which the mount is mounted and which is movable in a travel direction;
    a determination circuit configured to determine a lastly moved part of the robot which is lastly moved to make the robot take an operation posture;
    a calculation circuit configured to calculate, based on the lastly moved part, an angle between the travel direction and the orientation axis of the first arm when the robot in the operation posture is viewed along the height axis; and
    a control circuit configured to control the robot to work on a workpiece keeping the robot in the operation posture with the calculated angle while controlling the moving body to move in the travel direction.

2. The robot system according to claim 1, wherein the determination circuit is configured to determine that the lastly moved part is the first arm or the mount.

3. The robot system according to claim 1, wherein the travel direction is substantially perpendicular to the height axis.

4. The robot system according to claim 1, wherein the calculation circuit is configured to calculate the angle to decrease a vibration of the robot caused by moving the lastly moved part to take the operation posture.

5. The robot system according to claim 1, wherein when the determination circuit determines that the lastly moved part is the mount, the calculation circuit calculates the angle as 90 degrees or −90 degrees.

6. The robot system according to claim 1, wherein when the determination circuit determines that the lastly moved part is the first arm, the calculation circuit calculates the angle as 0 degrees or 180 degrees.

7. The robot system according to claim 1, wherein the robot is configured to work on the workpiece from below the workpiece along the height axis.

8. The robot system according to claim 1,
    wherein the robot further comprises a second arm supported by a leading end of the first arm at a base end of the second arm, the second arm being rotatable around a second axis of the robot parallel to the first axis,
    wherein the first axis is offset from the height axis, and
    wherein the robot is configured to work on the workpiece while taking such a posture that the leading end of the first arm is further away from the height axis than the first axis is away from the height axis, a leading end of the second arm is further away from the height axis than the second axis is away from the height axis, and the leading end of the second arm is above a plane including the first axis and the second axis along the height axis.

9. The robot system according to claim 8,
    wherein the first arm has an arm length larger than an offset length by which the first axis is offset from the height axis, and
    wherein the second arm has an arm length larger than the arm length of the first arm.

10. The robot system according to claim 8,
    wherein the robot further comprises a wrist supported by the leading end of the second arm at a base end of the wrist, and
    wherein each of the second arm and the wrist comprises a hollow structure.

11. A method for controlling a robot, comprising:
    determining, by a determination circuit, a lastly moved part of the robot which is lastly moved to make the robot take an operation posture, the robot comprising a mount rotatable about a height axis along a height of the robot and a first arm connected to the mount rotatably around a first axis substantially perpendicular to the height axis, the first arm having an orientation axis which is substantially perpendicular to the first axis and which passes through the first axis;
    calculating, by a calculation circuit, based on the lastly moved part, an angle between a travel direction and the orientation axis of the first arm when the robot in the operation posture is viewed along the height axis, the mount being mounted on a moving body which is movable in the travel direction; and
    controlling, by a control circuit, the robot to work on a workpiece keeping the robot in the operation posture with the calculated angle while controlling the moving body to move in the travel direction.

12. The robot system according to claim 5, wherein the robot is configured to work on the workpiece from below the workpiece along the height axis.

13. The robot system according to claim 6, wherein the robot is configured to work on the workpiece from below the workpiece along the height axis.

14. The robot system according to claim 5,
    wherein the robot further comprises a second arm supported by a leading end of the first arm at a base end of the second arm, the second arm being rotatable around a second axis of the robot parallel to the first axis,
    wherein the first axis is offset from the height axis, and
    wherein the robot is configured to work on the workpiece while taking such a posture that the leading end of the first arm is further away from the height axis than the first axis is away from the height axis, a leading end of the second arm is further away from the height axis than the second axis is away from the height axis, and the leading end of the second arm is above a plane including the first axis and the second axis.

15. The robot system according to claim 6,
wherein the robot further comprises a second arm supported by a leading end of the first arm at a base end of the second arm, the second arm being rotatable around a second axis of the robot parallel to the first axis,
wherein the first axis is offset from the height axis, and
wherein the robot is configured to work on the workpiece while taking such a posture that the leading end of the first arm is further away from the height axis than the first axis is away from the height axis, a leading end of the second arm is further away from the height axis than the second axis is away from the height axis, and the leading end of the second arm is above a plane including the first axis and the second axis.

16. The robot system according to claim 7,
wherein the robot further comprises a second arm supported by a leading end of the first arm at a base end of the second arm, the second arm being rotatable around a second axis of the robot parallel to the first axis,
wherein the first axis is offset from the height axis, and
wherein the robot is configured to work on the workpiece while taking such a posture that the leading end of the first arm is further away from the height axis than the first axis is away from the height axis, a leading end of the second arm is further away from the height axis than the second axis is away from the height axis, and the leading end of the second arm is above a plane including the first axis and the second axis.

17. The robot system according to claim 12,
wherein the robot further comprises a second arm supported by a leading end of the first arm at a base end of the second arm, the second arm being rotatable around a second axis of the robot parallel to the first axis,
wherein the first axis is offset from the height axis, and
wherein the robot is configured to work on the workpiece while taking such a posture that the leading end of the first arm is further away from the height axis than the first axis is away from the height axis, a leading end of the second arm is further away from the height axis than the second axis is away from the height axis, and the leading end of the second arm is above a plane including the first axis and the second axis.

18. The robot system according to claim 13,
wherein the robot further comprises a second arm supported by a leading end of the first arm at a base end of the second arm, the second arm being rotatable around a second axis of the robot parallel to the first axis,
wherein the first axis is offset from the height axis, and
wherein the robot is configured to work on the workpiece while taking such a posture that the leading end of the first arm is further away from the height axis than the first axis is away from the height axis, a leading end of the second arm is further away from the height axis than the second axis is away from the height axis, and the leading end of the second arm is above a plane including the first axis and the second axis.

19. The robot system according to claim 14,
wherein the first arm has an arm length larger than an offset length by which the first axis is offset from the height axis, and
wherein the second arm has an arm length larger than the arm length of the first arm.

20. A robot system comprising:
a robot comprising:
   a mount rotatable about a height axis along a height of the robot; and
   a first arm connected to the mount rotatably around a first axis substantially perpendicular to the height axis, the first arm having an orientation axis which is substantially perpendicular to the first axis and which passes through the first axis;
a moving body on which the mount is mounted and which is movable in a travel direction;
determining means for determining a lastly moved part of the robot which is lastly moved to make the robot take an operation posture;
calculating means for calculating, based on the lastly moved part, an angle between the travel direction and the orientation axis of the first arm when the robot in the operation posture is viewed along the height axis; and
controlling means for controlling the robot to work on a workpiece keeping the robot in the operation posture with the calculated angle while controlling the moving body to move in the travel direction.

* * * * *